June 30, 1931.  H. H. BOYCE  1,812,679
THERMOMETER
Filed May 24, 1927

INVENTOR
HARRISON H. BOYCE
BY
ATTORNEY

Patented June 30, 1931

1,812,679

UNITED STATES PATENT OFFICE

HARRISON HURLBERT BOYCE, OF JERICHO, LONG ISLAND, NEW YORK

THERMOMETER

Application filed May 24, 1927. Serial No. 193,770.

This invention relates to improvements in thermometers or other indicating gauges for various purposes and it has particular reference to a means for magnifying a portion of the column of temperature responsive fluid in a portable thermometer.

Portable thermometers are frequently used around the household and frequently are hung outside of the window to determine out-of-door conditions. In such thermometers for example, it is impossible to see the minute fluid column from a distance. It is also very difficult to determine particular conditions such as the freezing range because of the uniformity of the thermometer bore. The observation of these temperatures indications under the actual local conditions may become unpleasant or perhaps impossible.

It is, therefore, the principal object of this invention to provide a relatively cheap and yet highly effective means to magnify the indication of a thermometer or heat indicator within a certain critical range.

It is a further object of the invention to provide a means to be applied to a thermometer to more readily facilitate accurate determination of the indicated value from a considerable distance.

It is another object of this invention to so construct a thermometer that certain desired portions of the indicating column will be apparently enlarged or magnified for the purpose of more readily reading the same and impressing it on the eye without affecting the sensitivity of the instrument.

The invention further contemplates an improvement for thermometers of the class described which may be readily and economically manufactured and is adapted for easy addition to the present thermometer construction and will be a great aid in determining critical ranges in those thermometers.

Further objects and advantages of this invention will appear from the following description of the attached drawings which illustrate several forms of embodiment to which the invention is adaptable and in which Fig. 1 is a front elevational view of a thermometer showing the application of my invention thereto.

Figure 1:
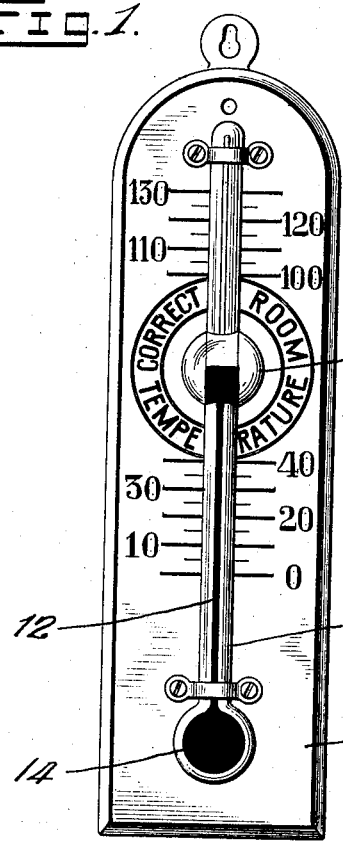

The thermometer of Fig. 1 is intended for indicating the relative temperature of a room or for any other general use. Usually they are hung on the wall in full view of the occupants of the room. Sometimes, however, they are hung in inaccessible places such as in a refrigerator, processing vat, cold storage room, or the like and too often, rather than expose the operator to the particular temperature of the subject they indicate, the temperature is either not read or is but casually, and often incorrectly, read from a distance. In either case it is desirable to provide a means for accentuating the readings at the critical point of the temperature to be measured and this is provided for in my thermometer which comprises an indicating thermometer stem 10 provided with a uniform bore 12 which is filled with a colored fluid 14 subject to expand when heated and to contract when cooled.

Figure 3:
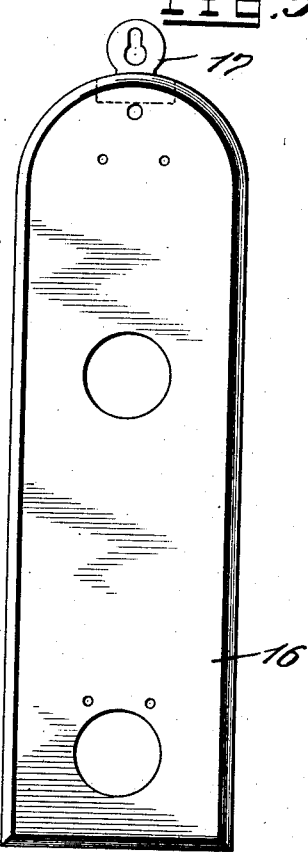
Figs. 3, 4 and 5 are detail views of the parts that make up the thermometers shown in Fig. 1 being the base portion, thermometer and magnifying elements in section respectively.

The stem 10 is of a transparent material such as glass and to permit portability without danger of breaking the stem, a back or base portion 16 of wood or metal or any other material suitable to support and protect the instrument is provided. As shown in Fig. 3 the back 16 is suitably bored to receive the stem 10 and may be provided with a hook 17 to enable suspension of the instrument from an appropriate support.

Figures 4, 5:
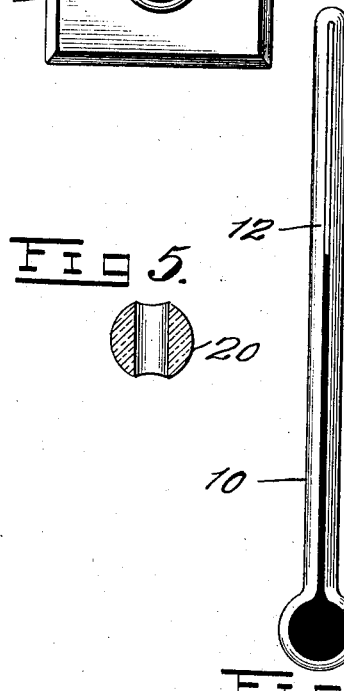

On the stem, corresponding with the indicated normal temperature range, a magnifying globe 20, is placed to magnify the size of the fluid column. As shown in Fig. 5 this element is substantially spherical in shape, being drilled to fit over the stem 10 of Fig. 4, and will be retained in its desired location by being fused to the thermometer stem or by the hole in the upper end of the back 16. Usually a glass bead or marble may be economically adapted for this lens and if no back 16 is provided, merely fusing the lens to the stem would be sufficient to retain it in place. It might be desirable also to form the lens in the stem itself but the preferred form is shown in Figs. 1 to 5.

Figure 2:
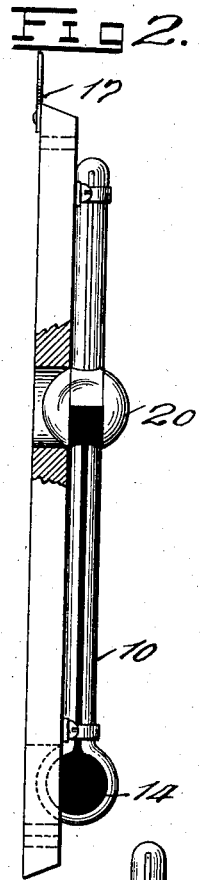
Fig. 2 is a side view of the improved thermometer shown in Fig. 1.

As shown in Figs. 1 and 2 the apparent size of the bore has been magnified to several times the normal size by the globe 20 and yet, by not actually changing the bore, the uniform changes in temperature will continue to cause uniform changes in the height of the fluid column and will not change its sensitivity. An indicating scale may be provided on the supporting element 16 and a particular range thereon set apart for more readily determining the critical temperature by means of a separately marked portion. For example, if a room were desired to be maintained around 70 degrees the magnifying element would be placed on the stem at that calibration and by glancing at the thermometer from any point in the room it may be quickly seen that the desired temperature is or is not being maintained.

It is not necessary that the lens or globe 20 be placed exactly as shown as the preferred indicating range of normal or desired temperature might be of a cold storage room from 35 to 45 degrees, for example. In such a case the lens would be placed correspondingly lower on the scale and similarly may be placed anywhere thereon, the normal or critical temperature being substantially covered and specially indicated by the enlargement.

Figures 6, 7, 8:
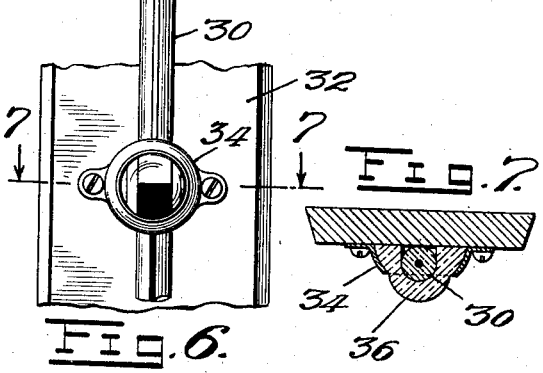
Fig. 6 is a partial elevation of the upper end of a thermometer of a slightly modified form.
Fig. 7 is a horizontal section on the line 7—7 of Fig. 6.
Fig. 8 is a detail of a modified form of magnifying element.

In Figs. 6, 7 and 8, a slightly modified form of magnifying element is illustrated in which the stem 30 of the thermometer is attached to the supporting back 32 by a ring 34 suitably constructed to enclose a semispherical lens or magnifying element 36. This lens 36 is drilled or cut to embrace the thermometer stem 30 and similarly magnifies the portion of the uniform bore that it covers and will similarly be placed adjacent to that portion of the indicating range of the fluid which it is particularly desired to enlarge.

The foregoing detailed description clearly illustrates a very simple and yet effective means to be attached to the stem of an indicating thermometer in which the comparatively small and difficult-to-read bore may be acurately magnified and enlarged to facilitate reading without the outlay of great expense or without affecting the sensitivity of the instrument. It is ideally adapted to be used with any thermometer but is shown for a thermometer to indicate room temperature which may be of any temperature to suit individual conditions. Such a use will permit a greater degree of control with less inconvenience to the operator and in general, will cost very little more to produce.

While I have described various forms of embodiment of this invention, it is known that other modifications may be made and I, therefore, desire protection on the broad spirit of the invention as described and within the scope of the appended claims.

I claim:

1. In a household thermometer for determining room temperature of the class described, the combination with an indicating thermometer stem filled with a temperature responsive fluid, of a base provided with a scale, means for affixing the stem to the base and a lens like element adjacent a certain restricted portion only of the scale to magnify the fluid at said portion.

2. In an indicating thermometer of the class described comprising a stem having a uniform bore therein filled with an indicating fluid, a globular lens drilled and fitted over the thermometer stem and means for supporting the stem, said means having a calibrated scale particularly indicating a room temperature range, the said lens exaggerating the changes of the indicating fluid within said temperature range.

3. In an indicating thermometer for household use, comprising a thermometer stem, a base to support said stem, said base having a calibrated scale particularly indicating the normal room temperature range, and a lens element small in comparison with the length of said scale to magnify only that part of the stem corresponding to the normal room temperature range.

4. In an indicating thermometer of the class described, a thermometer stem and indicating fluid therein, a portion of said stem corresponding to the normal predetermined temperature range, and a lens element small in comparison with the length of said stem and superposed on said thermometer stem to magnify the indicated changes of temperature within said range, said lens element being permanently secured to said stem.

5. In a thermometer of the type described, a temperature-responsive element comprising a permanently set bulb and a bored tube containing a thermally responsive liquid, means bearing a calibrated scale and supporting said temperature responsive element and means on said tube small in comparison with the length of the tube to magnify the size of the bore adjacent a particular temperature desired.

6. In a thermometer of the type described, a calibrated plate bearing a scale, a thermometer tube mounted on said plate and means small in comparison with the length of the tube to magnify the tube adjacent a particular point on the scale, said scale having a fixed position dial at the particular point to be magnified.

7. In a thermometer of the type described, a calibrated plate bearing a scale, a thermometer tube on said plate and permanently secured means to magnify the tube adjacent part only of the readings on said scale to indicate the temperature corresponding to the particular point magnified.

8. In a thermometer for particularly indicating a specified temperature comprising a thermometer stem having a uniform bore therein filled with a thermally responsive indicating fluid, a supporting back to receive and mount said stem, the back having a graduated scale thereon, certain portions of which are particularly set off to indicate the normal temperature range and a lens element applied to said stem and small in comparison with the length thereof to magnify the bore in the normal temperature range and to exaggerate the indicating fluid within said range.

9. An indicating thermometer of the class described, comprising a stem containing a temperature receiving-fluid, a portion of the stem corresponding to a desired temperature range and a lens element fixed in relation to the stem and small in comparison with the length thereof to magnify indications of temperature within said range.

10. An indicating thermometer, of the class described, comprising a support having a calibrated scale, an indicating dial adjacent one portion only of said calibrated scale, a thermometer mounted on said support, having a temperature responsive fluid therein, said temperature responsive fluid adapted to pass over said indicating dial, a lens permanently affixed with respect to said indicating dial and adapted to apparently enlarge and magnify the temperature responsive fluid solely throughout the range of the indicating dial.

In testimony whereof I have affixed my signature to this specification.

HARRISON H. BOYCE.